United States Patent
Hu et al.

(10) Patent No.: US 9,382,019 B2
(45) Date of Patent: Jul. 5, 2016

(54) DESPIN DEVICE

(71) Applicant: NATIONAL PINGTUNG UNIVERSITY OF SCIENCE & TECHNOLOGY, Pingtung County (TW)

(72) Inventors: Hui-Wen Hu, Pingtung County (TW); Ming-Tzu Ho, Pingtung County (TW); Pin-Tsung Wu, Pingtung County (TW); Huan-Sheng Chen, Pingtung County (TW)

(73) Assignee: National Pingtung University of Science & Technology, Pingtung County (TW)

( * ) Notice: Subject to any disclaimer, the term of this patent is extended or adjusted under 35 U.S.C. 154(b) by 37 days.

(21) Appl. No.: 14/503,454

(22) Filed: Oct. 1, 2014

(65) Prior Publication Data

US 2015/0266594 A1    Sep. 24, 2015

(30) Foreign Application Priority Data

Mar. 18, 2014  (TW) .............................. 103110148 A

(51) Int. Cl.
*B64G 1/34* (2006.01)

(52) U.S. Cl.
CPC ....................... *B64G 1/34* (2013.01)

(58) Field of Classification Search
CPC ..................... B64G 1/34; B64G 1/24
See application file for complete search history.

(56) References Cited

U.S. PATENT DOCUMENTS

| 3,128,845 | A | * | 4/1964 | Parker | B64G 1/281 102/377 |
| 3,229,930 | A | * | 1/1966 | Fedor | B64G 1/28 188/380 |
| 3,286,630 | A | * | 11/1966 | Salmirs | B64G 1/641 102/377 |
| 3,369,772 | A | * | 2/1968 | Eberlein | F41G 7/36 244/3.2 |
| 3,715,092 | A | * | 2/1973 | Moyer | B64G 1/645 244/167 |
| 4,350,315 | A | * | 9/1982 | Pollin | F42B 10/16 244/3.1 |
| 4,373,690 | A | * | 2/1983 | Stillman | B64G 1/222 136/245 |
| 4,436,259 | A | * | 3/1984 | Schmidt | B64C 1/38 244/165 |
| 5,474,264 | A | * | 12/1995 | Lund | B64G 1/34 244/167 |
| 9,139,304 | B2 | * | 9/2015 | Frucht | B64D 17/24 |
| 2004/0012865 | A1 | * | 1/2004 | Huang | B64G 1/222 359/853 |

* cited by examiner

*Primary Examiner* — Justin Benedik
(74) *Attorney, Agent, or Firm* — Alan D. Kamrath; Kamrath IP Lawfirm, P.A.

(57) ABSTRACT

A despin device includes a central base installed in an outer rotational ring. The outer rotational ring includes a plurality of through-holes extending from an inner wall face thereof through an outer wall face thereof. Masses are symmetrically installed in ball grooves of the central base and the through-holes of the outer rotational ring. The masses are connected by a connecting line extending through a line cutter and tensioned by a tensioning device. Cables are wrapped around an outer periphery of the central base. Each cable includes an end attached to one of the masses. A plurality of release-hitch devices is provided. Each release-hitch device includes a hitch member fixed to the central base and a disengagement member releasably engaged with the hitch member and fixed to the other end of one of the cables.

15 Claims, 11 Drawing Sheets

DESPIN DEVICE

BACKGROUND OF THE INVENTION

1. Field of the Invention

The present invention relates to a despin device and, more particularly, to a despin device mounted to an object spinning at a high speed to reduce an axial spinning speed of the object at an appropriate time.

2. Description of the Related Art

In space missions, originally fixed modules of a flying vehicle can be separated from each other, for instance, the departure of a payload (such as a satellite) from a rocket, or the activation of solar cell panels on a satellite.

Since an ordinary flying vehicle does not have attitude control, the flying vehicle often has to spin about its axis (at a speed of about 2-5 revolutions per second) during the flight to compensate asymmetric or residual propulsion, thereby increasing the flying stability of the flying vehicle. However, after the booster of the flying vehicle has stopped, it is difficult to control the trajectory of the payload under spinning together with the flying vehicle at a high speed such that the payload (such as a satellite or experimental equipment) often cannot be properly released to perform the mission. Thus, effective despin operation must be carried out on the flying vehicle to stabilize the flying vehicle. Therefore, the payload can be smoothly separated.

Taking a rocket as an example, the despin operation can be achieved by a yo-yo despin device. The conventional despin device includes a central base mounted between two rocket bodies, and a plurality of cables is provided to connect a plurality of masses, respectively. The cables are evenly wrapped around the central base. The masses are released at an appropriate time and move away from the central base due to the centrifugal force through the central base spinning together with the rocket bodies. The masses and cables are gradually deployed to generate an angular momentum contrary to the spin direction. Due to the laws of conservation of kinetic energy and momentum, the contrary angular momentum compels central base to despin.

However, since the cables of the conventional despin device are fixed to the central base, when each cable wrapped around the central base is drawn by the corresponding mass and is released to the final stage, the masses that continuously spin will cause the cables to rewrape. Thus, the masses may hit and damage the central base. As a result, this may lead to the instability of rocket and the trajectory deviation of payload after separating from the rocket. Thus, improvement to the conventional despin device is required.

Besides, the high speed of flying vehicle always induces heat flux at the vehicle surface. The heat flux may damage the conventional yo-yo despin system (such as cables, joints and electronic board.). Thus, the improvement of heat protection design (such as an outer rotational ring) is also required.

SUMMARY OF THE INVENTION

An objective of the present invention is to provide a despin device including a plurality of masses and a plurality of cables, wherein the cables are disengaged from the central base together with the masses when the cables are drawn and released by the masses to the final stage, avoiding rewrapping of the cables.

The present invention fulfills the above objective by providing a despin device including a central base having an outer periphery with a plurality of ball grooves. The central base further includes an axial end face extending transversely to the outer periphery and extending transversely to a central axis of the central base. An outer rotational ring includes a hollow interior. The central base is installed in the hollow interior. The outer rotational ring includes an inner wall face and an outer wall face. The outer rotational ring further includes a plurality of through-holes extending from the inner wall face through the outer wall face. A despin module includes a line cutter, a tensioning device, a plurality of masses, a connecting line, a plurality of cables, and a plurality of release-hitch devices. The line cutter and the tensioning device are mounted to the axial end face of the central base. The plurality of masses is symmetrically installed in the plurality of ball grooves of the central base and the plurality of through-holes of the outer rotational ring. The connecting line connects the plurality of masses. The connecting line extends through the line cutter and is tensioned by the tensioning device. The plurality of cables is wrapped around the outer periphery of the central base. Each of the plurality of cables includes a first end attached to one of the plurality of masses and a second end. Each of the release-hitch devices includes a hitch member fixed to the central base and a disengagement member releasably engaged with the hitch member and fixed to the second end of one of the plurality of cables.

The outer periphery of the central base can include a plurality of coupling grooves. The number of the plurality of coupling grooves corresponds to the number of the plurality of ball grooves. The hitch members are respectively engaged in the plurality of coupling grooves. Each hitch member includes a slant groove having an opening facing the inner wall face of the outer rotational ring. Each of the plurality of cables is wrapped around the outer periphery of the central base when the connecting line is intact. Each of the plurality of cables is freed when the connecting line is broken by the line cutter. When the connecting line is intact, each disengagement member is tensioned by a corresponding one of the plurality of cables to engage with the slant groove of one of the hitch members. When the connecting line is broken, each disengagement member is drawn by a completely released corresponding one of the plurality of cables and disengages from the slant groove of one of the hitch members.

Each of the plurality of coupling grooves can extend from the outer periphery of the central base through the axial end face of the central base.

Each of the plurality of ball grooves can extend from the outer periphery of the central base through the axial end face of the central base.

Each of the plurality of masses can include an abutment member and a connection seat connected to the abutment member. Each abutment member is partially installed in one of the plurality of ball grooves. Each connection seat is installed in one of the plurality of through-holes of the outer rotational ring.

The connecting line can be connected to the abutment member of each of the plurality of masses and can be opposite to each connection seat.

Each of the plurality of through-holes of the outer rotational ring can have increasing inner diameters from the inner wall face towards the outer wall face of the outer rotational ring. Each connection seat includes an inner end face connected to a corresponding one of the abutment members and an outer end face opposite to the inner end face. Each connection seat can further include a peripheral face extending between the inner end face and the outer end face. The peripheral face of each connection seat can have increasing outer diameters from the inner end face towards the outer end face to form a conical face matching a corresponding one of the plurality of through-holes of the outer rotational ring. A portion of each abutment member connected to a corresponding one of the connection seats is cylindrical and has an end face abutting the connection seat such that each abutment member and the corresponding connection seat have a face-to-face contact therebetween. The central base can further include a plurality of guiding pins mounted to the outer periphery of the central base. Each of the plurality of guiding pins includes an outer surface with a plurality of guiding grooves. The plurality of cables is wrapped around the outer periphery of the central base and respectively extended through the plurality of guiding grooves of the plurality of guiding pins.

Two aligned guiding grooves respectively of two adjacent guiding pins extend along a helix about the central axis of the central base.

The outer periphery of the central base can further include a plurality of positioning grooves. Each of the plurality of positioning grooves can extend along an axis parallel to the central axis of the central base. The plurality of guiding pins is respectively mounted in the plurality of positioning grooves.

The plurality of guiding pins can be spaced from the plurality of ball grooves and the plurality of coupling grooves. The plurality of guiding pins can be spaced from each other at regular angular intervals.

The despin device can further include a rotating member coupled to an axial end of the outer rotational ring.

The outer rotational ring can include an inner flange on the axial end thereof. The inner flange extends from the inner wall face of the outer rotational ring towards a central axis of the outer rotational ring. The inner flange of the outer rotational ring is coupled to the rotating member.

The despin device can further include a plurality of buffering devices. Each of the plurality of buffering devices includes a mounting seat and a roller rotatably mounted to the mounting seat. The outer rotational ring further includes an axial end having an end face with a plurality of notches. Each of the plurality of notches extends to the outer wall face of the outer rotational ring. The mounting seat of each of the plurality of buffering devices is engaged in one of the plurality of notches. Each roller is installed in the outer rotational ring and is located adjacent to an edge of one of the plurality of through-holes. Each roller is adapted to contact one of the plurality of cables connected to the plurality of masses when a corresponding one of the plurality of masses is freed as the connecting line is broken. Each roller is adapted to be driven to rotate by the one of the plurality of cables when a corresponding one of the plurality of masses is freed as the connecting line is broken.

The present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where.

DETAILED DESCRIPTION OF THE INVENTION

With reference to FIGS. 1-5, a despin device of an embodiment according to the present invention includes a central base 1, an outer rotational ring 2, and a despin module 3. The central base 1 is mounted in the outer rotational ring 2. The despin module 3 is connected to the central base 1 and the outer rotational ring 2. The despin device according to the present invention is mounted to an object capable of spinning at a high speed and can be activated at an appropriate time to reduce the axial spinning speed of the object. The object capable of spinning at a high speed can be a rocket, satellite, or any launch vehicle in the aerospace field. The despin device according to the present invention will now be set forth by way of example of mounting between two adjacent bodies of a rocket to reduce the axial spinning speed of the rocket at an appropriate time. However, the present invention is not limited to this example, which can be appreciated by a person having ordinary skill in the art.

Figure 1:
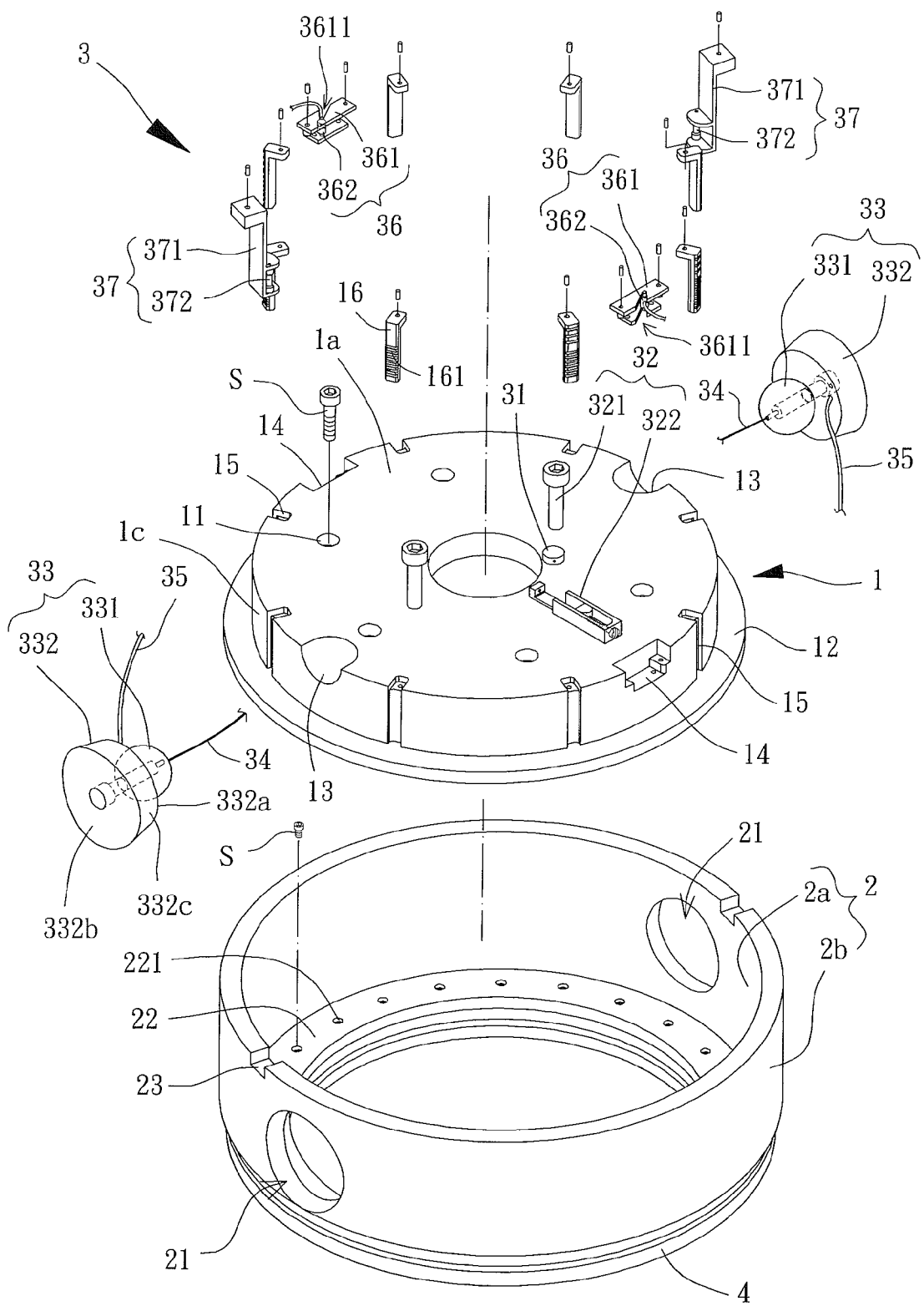
FIG. 1 is an exploded, perspective view of a despin device of an embodiment according to the present invention.
Figure 2:
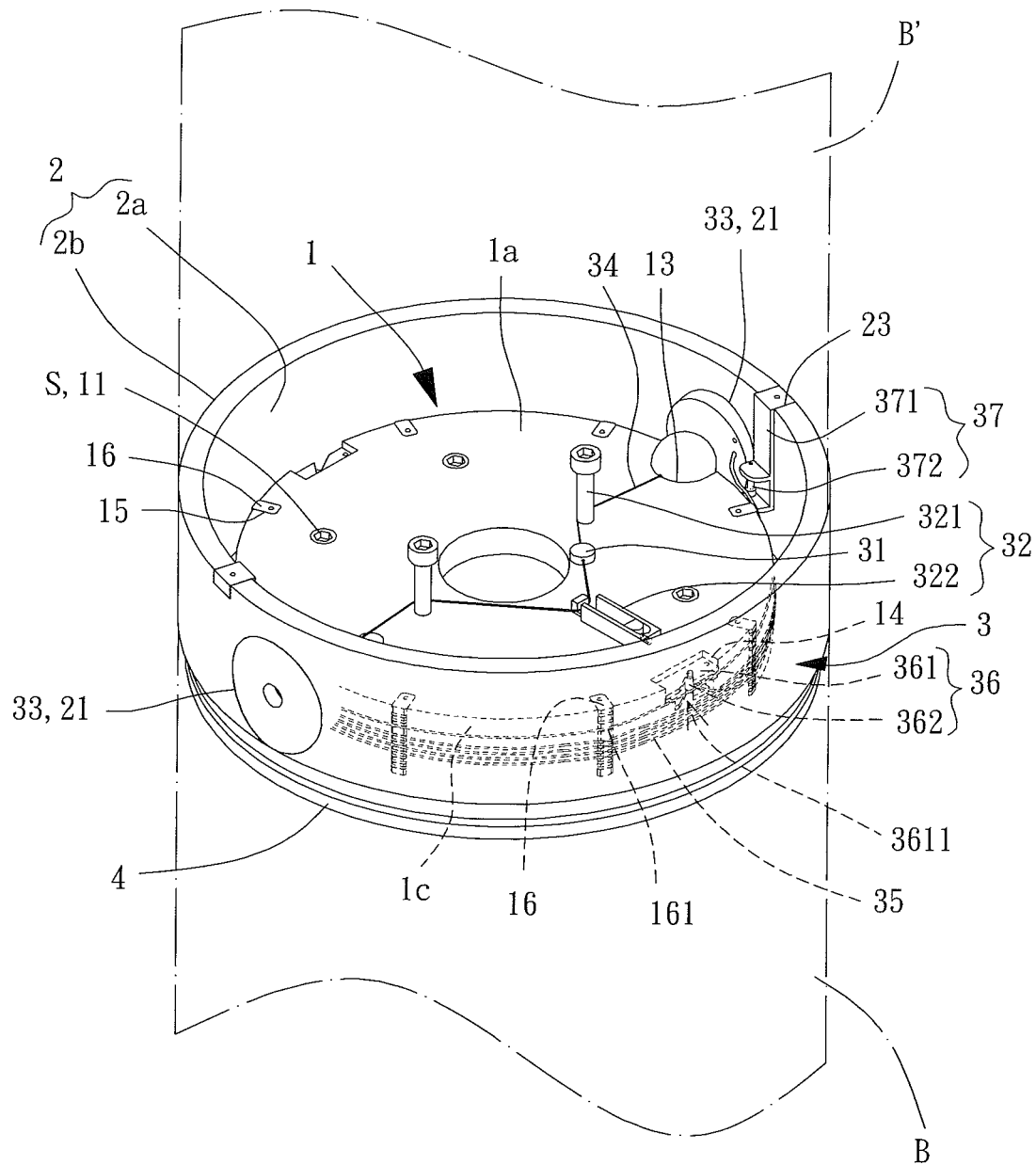
FIG. 2 is a perspective view of the despin device of FIG. 1.
Figure 5:
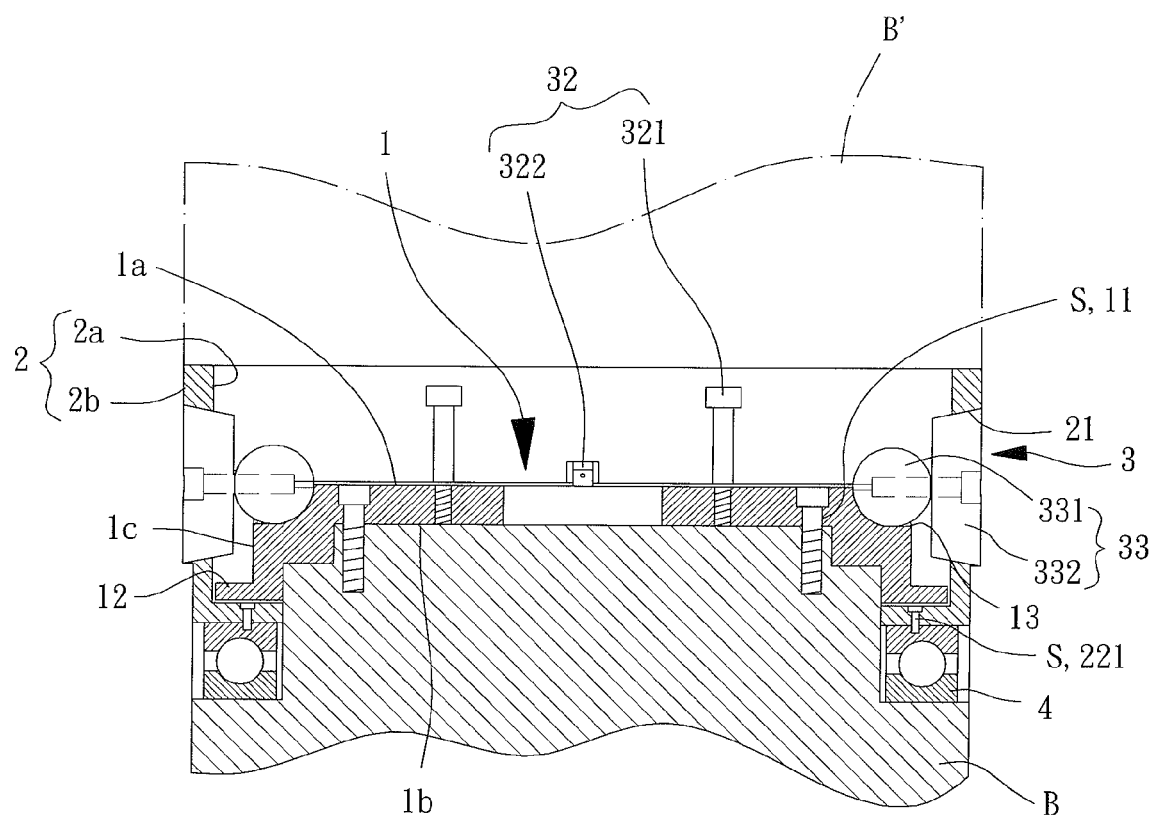
FIG. 5 is a cross sectional view taken along section line 5-5 of FIG. 4.

With reference to FIGS. 1, 2, and 5, the central base 1 is adapted to be mounted to the object whose speed is to be reduced by the despin device. The central base 1 includes two opposite axial end faces 1a and 1b and an outer periphery 1c. In this embodiment, the axial end faces 1a and 1b extend transversely to the outer periphery 1c and extend transversely to a central axis of the central base 1. Furthermore, the central base 1 includes a plurality of fixing holes 11 extending from the axial end face 1a through the axial end face 1b. Fasteners S can extend through the fixing holes 11 to fix the central base 1 to a rocket body B, with the axial end face 1b facing an axial end face of the rocket body B. Furthermore, to enhance the engagement, a radial securing mechanism can be provided between the central base 1 and the rocket body B, which can be appreciated by a person having ordinary skill in the art and which can be adjusted according to needs. Furthermore, the axial end face 1b of the central base 1 can extend outward in a radial direction perpendicular to the central axis of the central base 1 to form a flange 12.

The outer periphery 1c of the central base 1 includes a plurality of ball grooves 13 spaced from each other at regular angular intervals. The ball grooves 13 are used to position some components of the despin module 3. Preferably, each ball groove 13 extends from the outer periphery 1c of the central base 1 through the axial end face 1a of the central base 1 (namely, each ball groove 13 is formed in an edge where the axial end face 1a and the outer periphery 1c of the central base 1 meet), providing convenience to position the despin module 3.

The outer periphery 1c of the central base 1 further includes a plurality of coupling grooves 14. The number of the coupling grooves 14 corresponds to the number of the ball grooves 13. Each coupling groove 14 extends from the outer periphery 1c of the central base 1 through the axial end face 1a of the central base 1 (namely, each coupling groove 14 is formed in the edge where the axial end face 1a and the outer periphery 1c of the central base 1 meet). Thus, each coupling groove 14 has a larger opening to provide convenience to assemble some components of the despin module 3. The outer periphery 1c of the central base 1 further includes a plurality of positioning grooves 15 and a plurality of guiding pins 16. Each positioning groove 15 extends along an axis parallel to the central axis of the central base 1. Preferably, the positioning grooves 15 are spaced from the ball grooves 13 and the coupling grooves 14 and are spaced from each other at regular angular intervals (see FIG. 4). The guiding pins 16 are respectively mounted in the positioning grooves 15. Each guiding pin 16 includes an outer surface with a plurality of guiding grooves 161. Two aligned guiding grooves 161 respectively of two adjacent guiding pins 16 extend along a helix about the central axis of the central base 1 (see FIG. 3).

Referring to FIGS. 1 and 2 again, the outer rotational ring 2 includes a hollow interior in which the central base 1 is installed. The outer rotational ring 2 protects the central base 1 and the components mounted to the central base 1 from the heat flux damage induced by the aerodynamics during the launch procedure. The outer rotational ring 2 can be of any shape. Although the outer rotational ring 2 is a cylindrical ring in the form shown, the shape of the outer rotational ring 2 should not be limited. The outer rotational ring 2 includes an inner wall face 2a and an outer wall face 2b opposite to the inner wall face 2a. The outer rotational ring 2 further includes a plurality of through-holes 21 extending from the inner wall face 2a through the outer wall face 2b. Each through-hole 21 of the outer rotational ring 2 has increasing inner diameters from the inner wall face 2a towards the outer wall face 2b of the outer rotational ring 2 (namely, the inner diameter of each through-hole 21 increases from the inner wall face 2a towards the outer wall face 2b of the outer rotational ring 2). Furthermore, in this embodiment, the outer rotational ring 2 includes an inner flange 22 on an axial end thereof. The inner flange 22 extends from the inner wall face 2a of the outer rotational ring 2 towards a central axis of the outer rotational ring 2. The inner flange 22 includes a plurality of axially extending fixing holes 221. The outer rotational ring 2 further includes another axial end having an end face with a plurality of notches 23. Each notch 23 extends to the inner wall face 2a of the outer rotational ring 2.

The despin module 3 includes a line cutter 31, a tensioning device 32, a plurality of masses 33, a connecting line 34, a plurality of cables 35, and a plurality of release-hitch devices 36. The line cutter 31 and the tensioning device 32 are mounted to the axial end face 1a of the central base 1. The line cutter 31 can be a fuse switch. The connecting line 34 extends through the line cutter 31. The line cutter 31 can be controlled to provide power for heating the fuse, which, in turn, heats and breaks the connecting line 34. The tensioning device 32 can include a plurality of tightening members 321 and an adjusting member 322. The tightening members 321 are fixed to the central base 1 and protrude beyond the axial end face 1a of the central base 1. A string extends through the adjusting member 322 and can be used to adjust the tightness.

The masses 33 are symmetrically installed in the ball grooves 13 of the central base 1 and the through-holes 21 of the outer rotational ring 2. The material of the masses 33 is not limited. In this embodiment, each mass 33 includes an abutment member 331 and a connection seat 332 connected to the abutment member 331. Each abutment member 331 is partially installed in and abuts one of the ball grooves 13. Each connection seat 332 is installed in one of the through-holes 21 of the outer rotational ring 2.

Each connection seat 332 includes an inner end face 332a and an outer end face 332b opposite to the inner end face 332a in an axial direction. Each connection seat 332 further includes a peripheral face 332c extending between the inner end face 332a and the outer end face 332b. The inner end face 332a of each connection seat 332 is connected to a corresponding abutment member 331. The coupling between the abutment member 331 and the connection seat 332 can include threading connection, bonding, welding, male/female coupling, etc. Alternatively, the abutment member 331 and the connection seat 332 can be integrally formed with each other. The present invention is not limited to these. Furthermore, the peripheral face 332c of each connection seat 332 has increasing outer diameters from the inner end face 332a towards the outer end face 332b, forming a conical face to match a corresponding through-hole 21 of the outer rotational ring 2 (see FIG. 5). Thus, the coupling depth between each connection seat 332 and the corresponding through-hole 21 can be restrained to avoid the connection seat 332 from passing through the corresponding through-hole 21 into an interior of the outer rotational ring 2.

Figure 4:
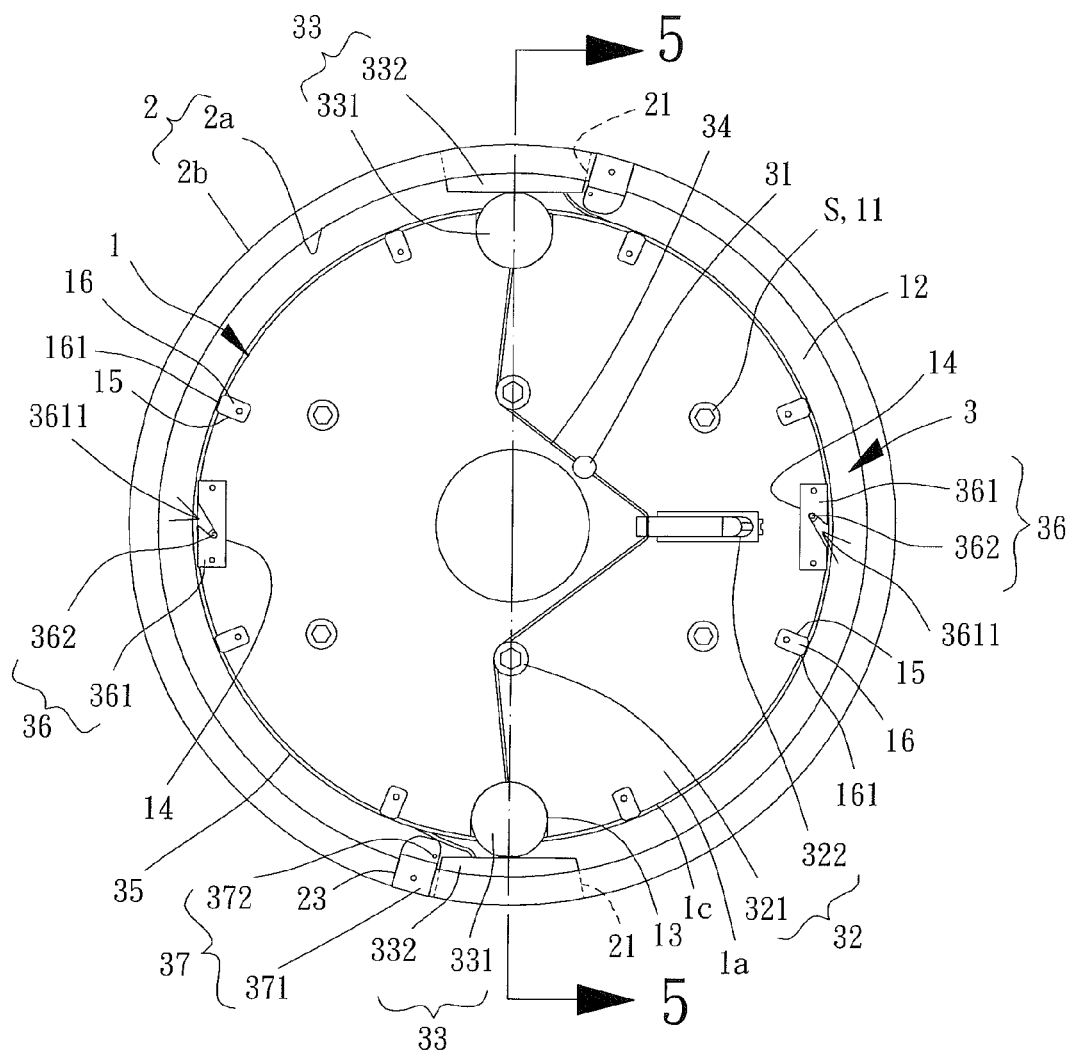
FIG. 4 is a plan view of the despin device of FIG. 1.

Referring to FIGS. 1 and 4, the connecting line 34 connects the masses 33. In this embodiment, the connecting line 34 is connected to the abutment member 331 of each mass 33 and is opposite to each connection seat 332. The connecting line 34 extends through the line cutter 31, is wound around the tightening members 32, and can be pulled by the adjusting member 322 to be in a tensioned state, avoiding early disengagement of the ball masses 33 from the ball grooves 13 of the central base 1 and the through-holes 21 of the outer rotational ring 2 under the action of the centrifugal force.

Figure 3:
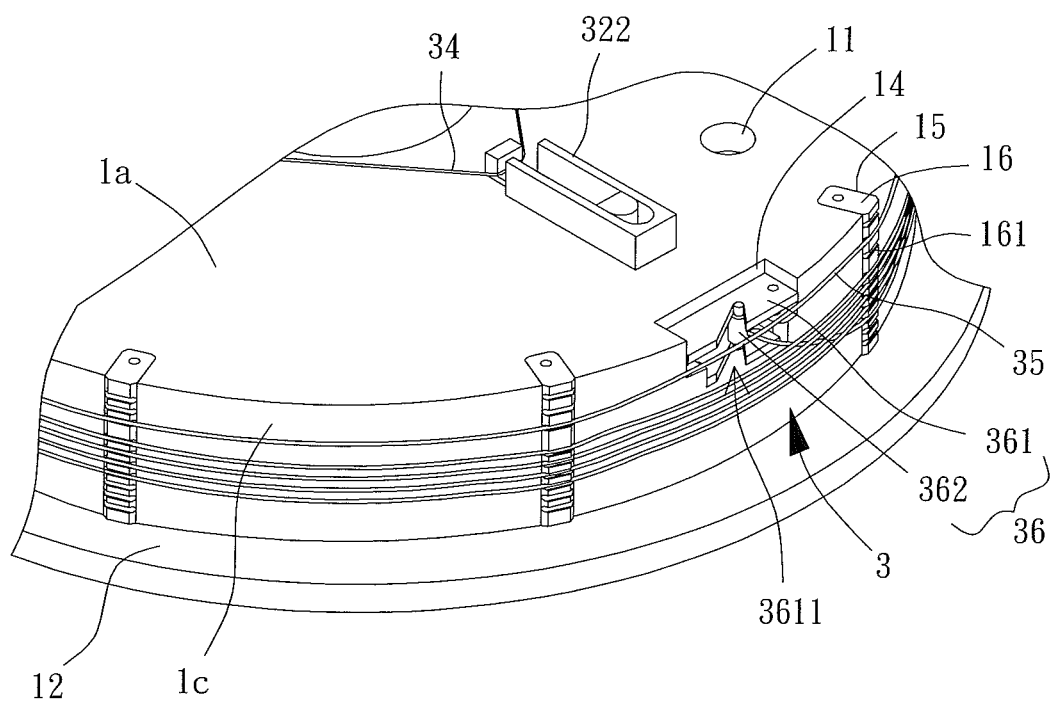
FIG. 3 is a partial, perspective view of the despin device of FIG. 1.

With reference to FIGS. 1 and 3, the number of the cables 35 corresponds to the number of the masses 33, and the cables 35 are respectively connected to the masses 33. Specifically, an end of each cable 35 is connected to the abutment member 331 or the connection seat 332 of a corresponding mass 33. Furthermore, the cables 35 are wrapped around the outer periphery 1c of the central base 1 and extend through the guiding grooves 161 of the guiding pins 16. Thus, the cables 35 are wrapped around the outer periphery 1c of the central base 1 without entangling, assuring complete release of the cables 35 in a subsequent release stage while avoiding the cables 35 from interfering with the release space of the masses 33. In a case that the guiding pins 16 are spaced from each other at regular angular intervals, the cables 35 can evenly be guided to increase the stability of each cable 35 wrapped around the outer periphery 1c of the central base 1.

Note that a plurality of helical grooves can directly be formed in the outer periphery 1c of the central base 1 to assist in wrapping and positioning of the cables 35 and to avoid the cables 35 from sliding up and down on the outer periphery 1c of the central base 1. However, forming of the helical grooves in the outer periphery 1c of the central base 1 is difficult. Thus, provision of the guiding pins 16 in this embodiment is selected to provide the same effect while reducing the manufacturing costs. Furthermore, the outer periphery 1c of the central base 1 does not have to include the positioning grooves 15 for coupling with the guiding pins 16. Namely, the guiding pins 16 can directly be mounted to the outer periphery 1c of the central base 1, which can be appreciated by a person having ordinary skill in the art.

Each release-hitch device 36 includes a hitch member 361 and a disengagement member 362 releasably engaged with the hitch member 361. The hitch members 361 are respectively engaged in the coupling grooves 14. Each hitch member 361 includes a slant groove 3611 having an opening facing the inner wall face 2a of the outer rotational ring 2. Each hitch member 361 is fixed to the other end of a corresponding cable 35. Each disengagement member 362 is tensioned by the corresponding cable 35 wrapped around the outer periphery 1c of the central base 1 to keep engaging with the slant groove 3611 of a corresponding hitch member 361. When the cables 35 are completely released, the disengagement members 362 disengage from the hitch members 361 via the slant grooves 3611 under drawing by the cables 35.

With reference to FIGS. 1 and 2, the despin module 3 can further include a plurality of buffering devices 37. The number of the buffering devices 37 corresponds to the number of the masses 33. Each buffering device 37 includes a mounting seat 371 and a roller 372 rotatably mounted to the mounting seat 371. The mounting seat 371 of each buffering device 37 is engaged in one of the notches 23 of the outer rotational ring 2. Thus, each roller 372 is installed in the outer rotational ring 2 and is located adjacent to an edge of one of the plurality of through-holes 21. Each roller 372 is adapted to contact one of the cables 35 connected to the masses 33 when a corresponding mass 33 is freed as the connecting line 34 is broken. Each roller 372 is adapted to be driven to rotate by the corresponding cable 35 when the corresponding mass 33 is freed as the connecting line 34 is broken.

With reference to FIGS. 1 and 5, the despin device can further a rotating member 4 coupled to the axial end of the outer rotational ring 2 to increase rotational smoothness of the outer rotational ring 2 rotating relative to the rocket body B. In this embodiment, the rotating member 4 is a bearing. The rotating member 4 is mounted to an end of the rocket body B coupled to the central base 1. The axial end of the outer rotational ring 2 having the inner flange 22 is coupled to the rotating member 4. Fasteners S extend through the fixing holes 221 of the inner flange 22 to reliably fix the outer rotational ring 2 to an end of the rotating member 4. Thus, the outer rotational ring 2 can rotate smoothly relative to the rocket body B about an axis of the rocket body B by the provision of the rotating member 4. The coupling between the outer rotational ring 2 and the rotating member 4 is not limited by the fasteners S. Other provisions including bonding, welding or male/female coupling can be used, which can be appreciated by a person having ordinary skill in the art and which should not be used to limit the present invention. Furthermore, the coupling between the outer rotational ring 2 and the rotating member 4 can be adjusted according to the arrangement of the end of the rocket body B. As an example, in a case that the central base 1 is connected to the rocket body B by lateral coupling, the rotating member 4 can be installed between the central base 1 and the outer rotational ring 2.

With reference to FIGS. 2 and 4, the despin device according to the present invention can be mounted between two rocket bodies B and B' to synchronously spin with the rocket bodies B and B' at a high speed. At this time, since the masses 33 are connected to the tensioned cables 35, the masses 33 can synchronously spin with the rocket bodies B and B' at the high speed. Each mass 33 is maintained in the corresponding ball groove 13 and the corresponding through-hole 21 rather than flying outward under the action of the centrifugal force.

Figure 6:
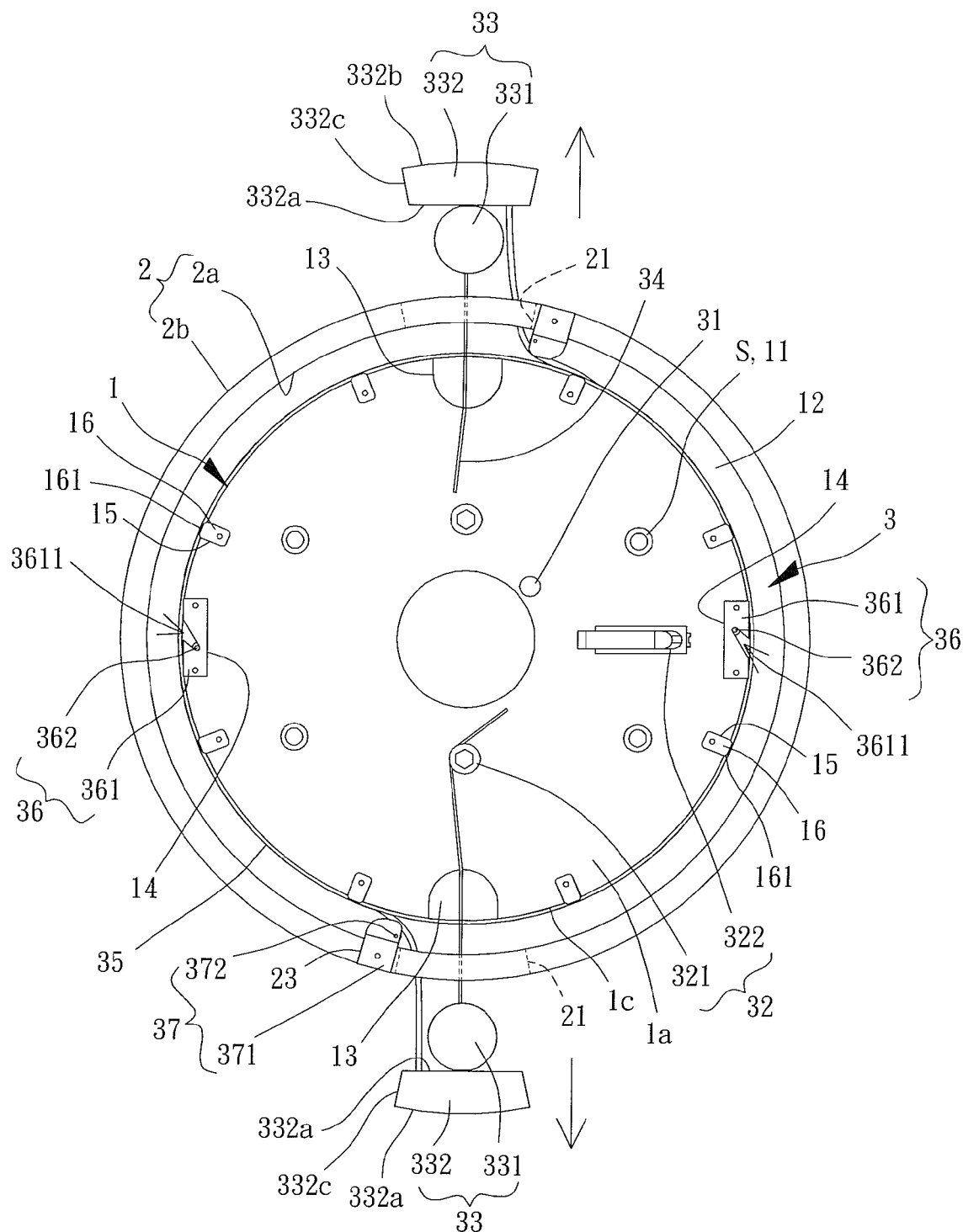
FIG. 6 is a view similar to FIG. 4, with a connecting line broken and with masses released.

With reference to FIG. 6, if it is intended to reduce the spinning speed of the two rocket bodies B and B' by the despin device, the line cutter 31 of the despin device breaks the connecting line 34 connecting the masses 33, such that the masses 33 are no longer restrained by the connecting line 34 and, thus, immediately move outward under the action of the centrifugal force.

Figure 7:
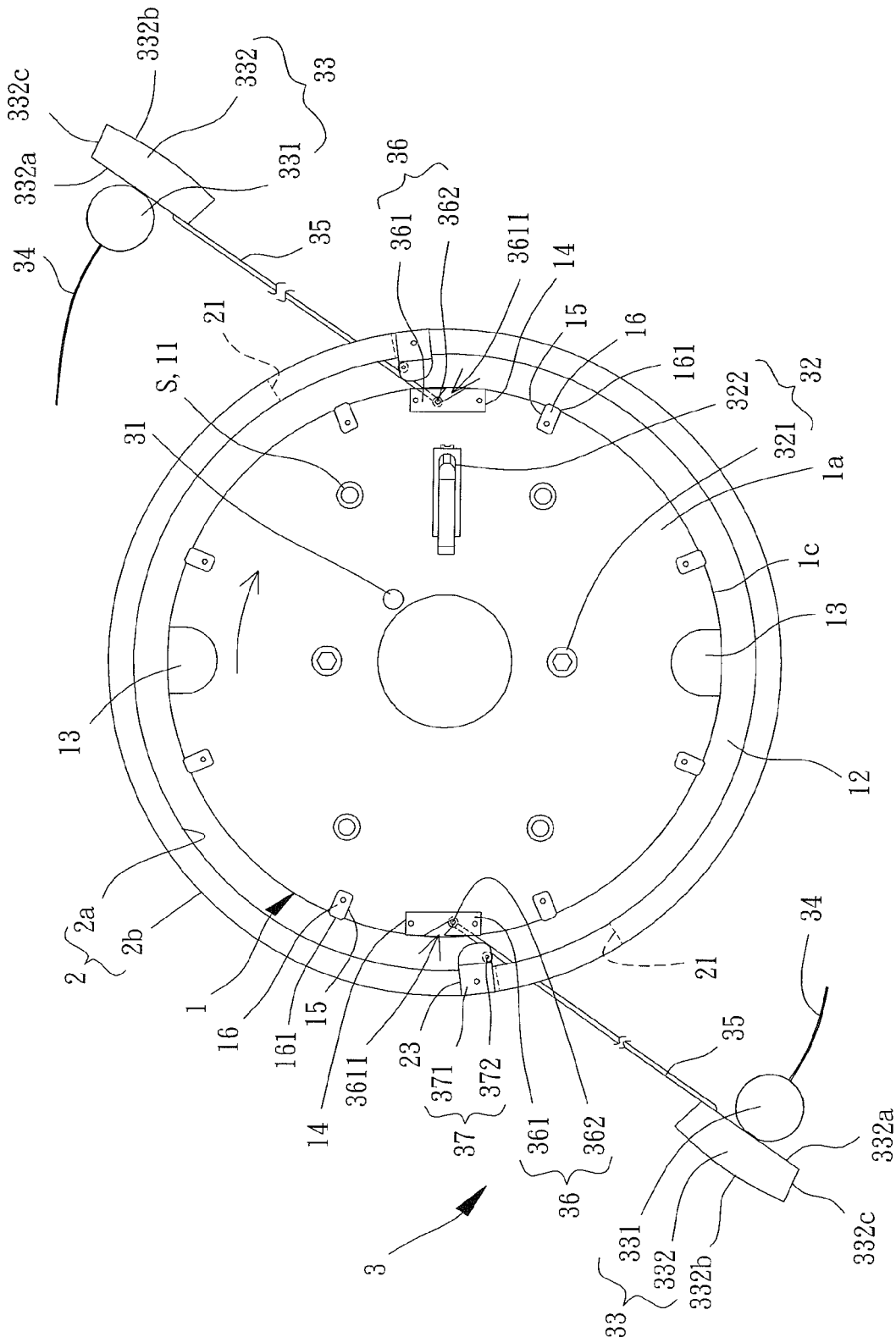
FIG. 7 is a view similar to FIG. 6, with cables drawn by the masses that fly outward.

With reference to FIGS. 6 and 7, after the masses 33 are thrown outward and disengage from the outer rotational ring 2, due to the influence of the two rockets B and B' that continuously spin, the masses 33 rotate about the two rocket bodies B and B' and begin to draw the cables 35 and, thus, gradually release the cables 35, continuously increasing the rotational radius of each mass 33. Due to an increase in the moment of inertia, the angular momentum of the spinning central base 1 is released to reduce the spinning speed thereof, which, in turn, reduces the spinning speed of the two rocket bodies B and B'. When each mass 33 draws a corresponding cables 35 to rotate relative to the central base 1, the cable 35 contacts the roller 372 of a corresponding buffering device 37. Thus, the rollers 372 are driven to rotate. Furthermore, the outer rotational ring 2 is also driven to smoothly rotate about the axis of the rocket body B relative to the central base 1 by the provision of the rotating member 4. Furthermore, the outer rotational ring 2 protects the components installed therein from being burned or impacted by alien objects.

Figure 8:
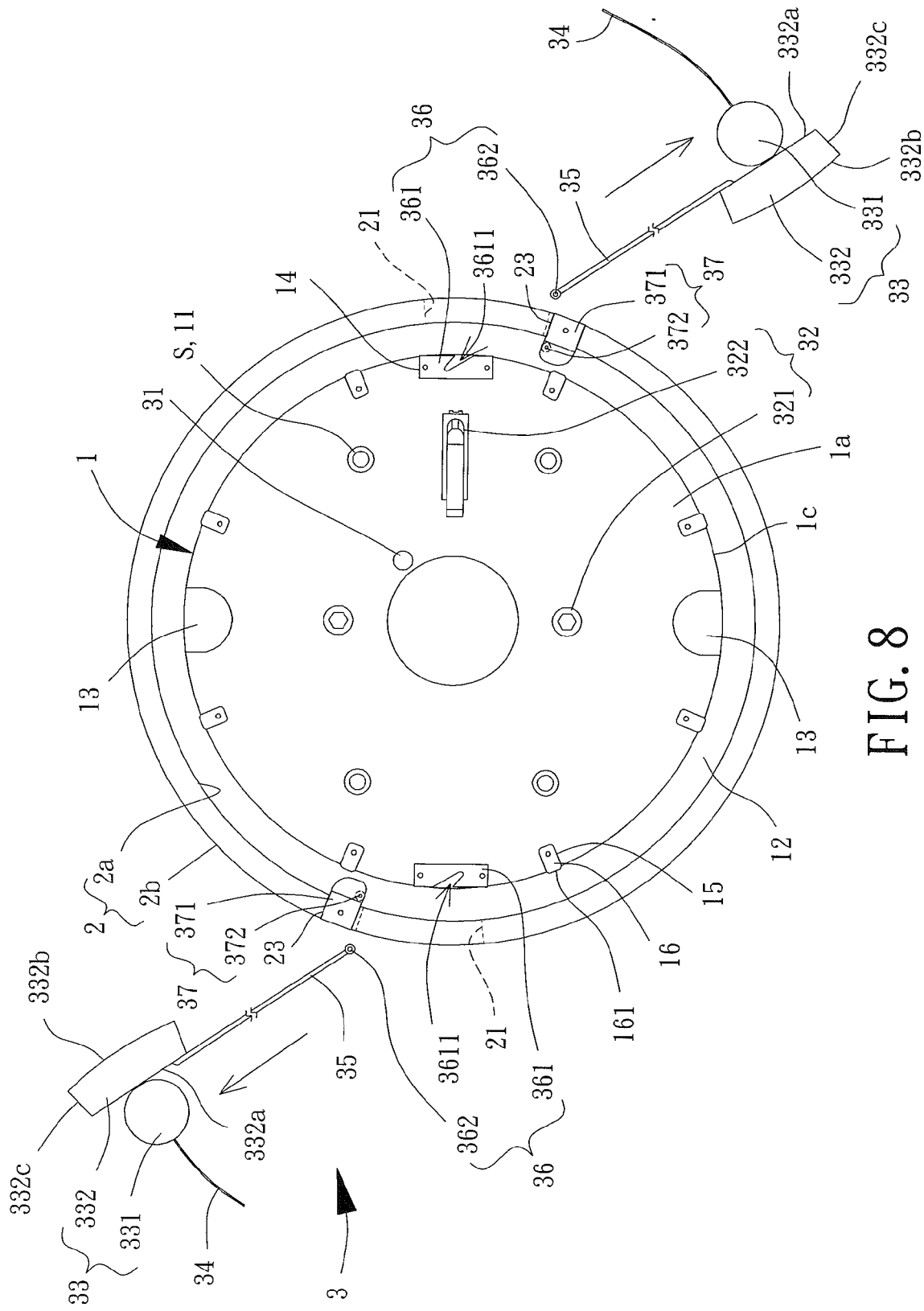
FIG. 8 is a view similar to FIG. 7, with the masses and the cables completely disengaged.

With reference to FIG. 8, when each cable 35 is completely released, each cable 35 is no longer wrapped around the outer periphery 1c of the central base 1. Furthermore, when the extending direction of each cable 35 is about to be parallel to an extending direction of the corresponding slant groove 3611, the corresponding disengagement member 362 is no longer engaged in the corresponding slant groove 3611 and can be drawn by the corresponding cable 35 to disengage from the corresponding hitch member 361 via the opening of the corresponding slant groove 3611, such that the corresponding mass 33, the corresponding cable 35, and the corresponding disengagement member 362 connected together can be thrown out and, thus, disengage from the despin device.

Figure 9:
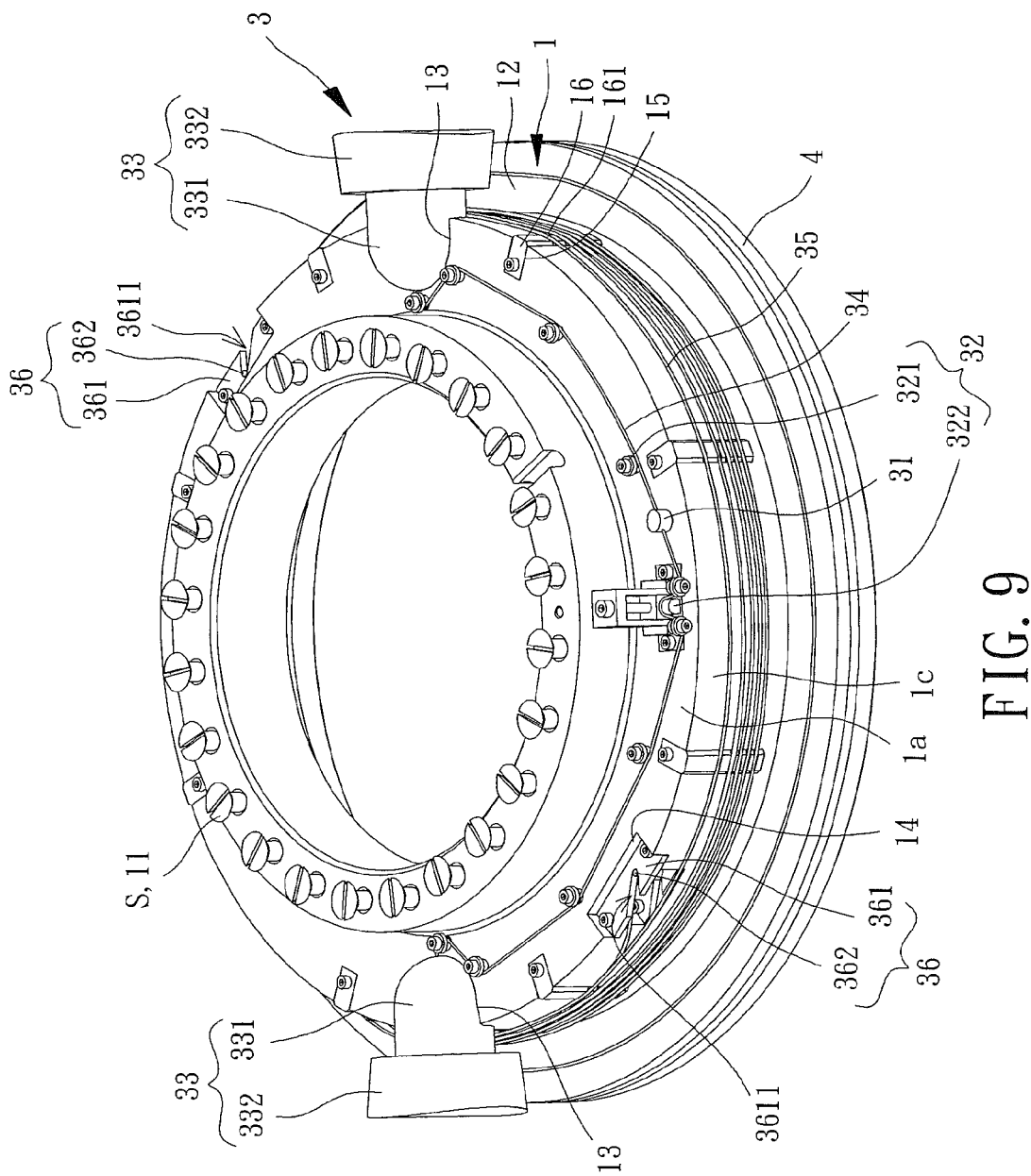
FIG. 9 is a partial, perspective view of a despin device of another embodiment according to the present invention.
Figure 10:
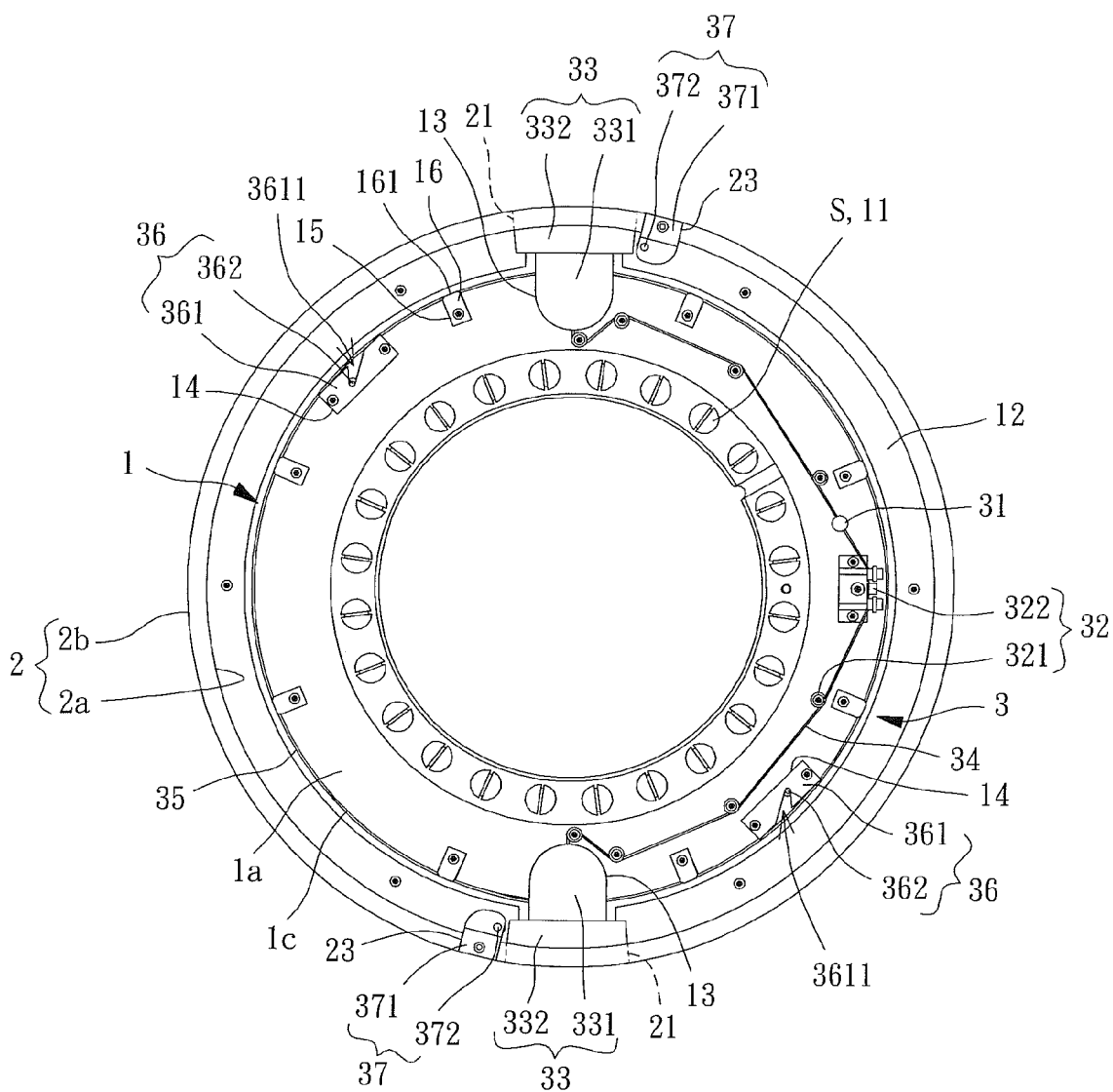
FIG. 10 is a plan view of the despin device of FIG. 9.
Figure 11:
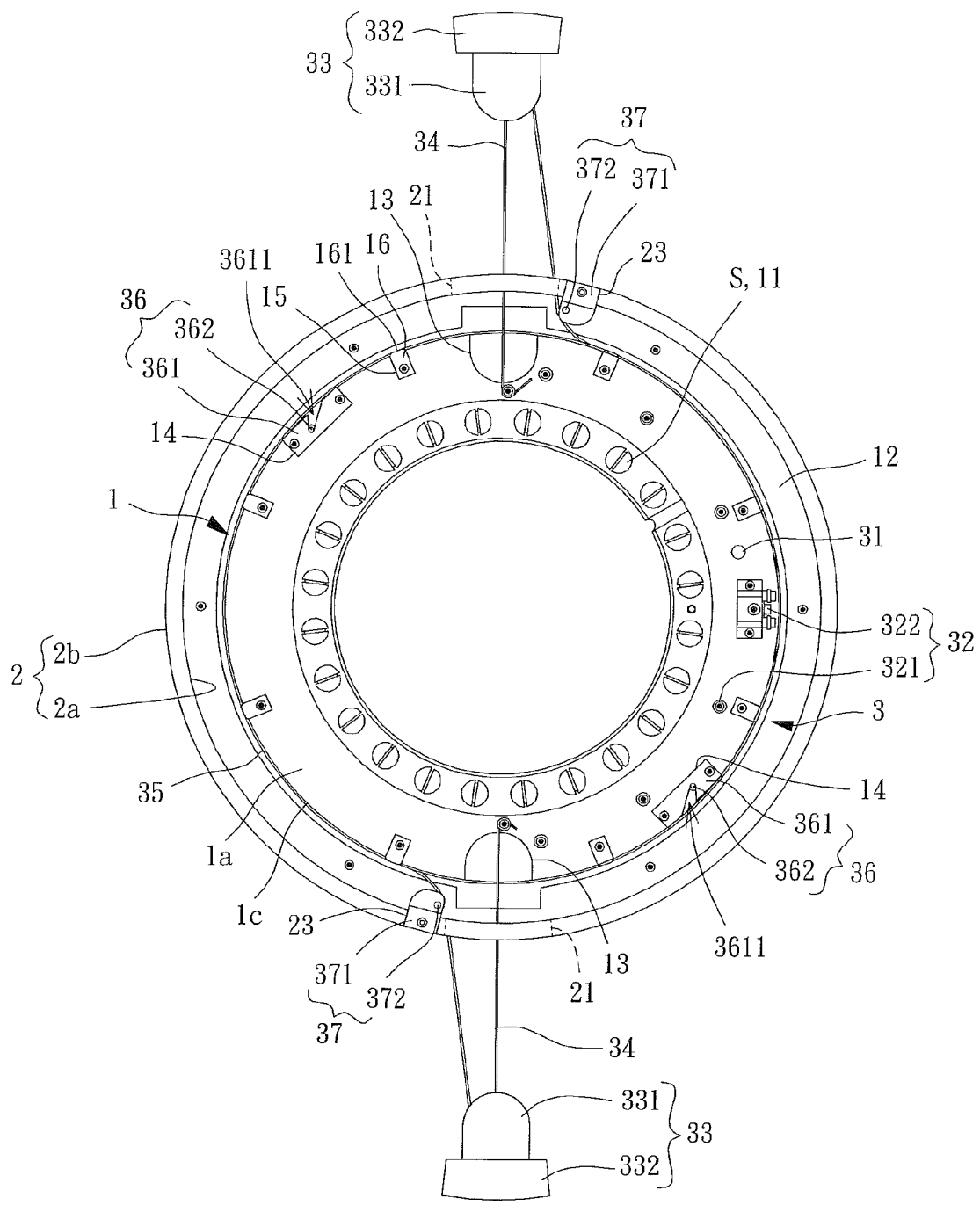
FIG. 11 is a view similar to FIG. 10, illustrating operation of the despin device.

FIGS. 9 and 10 show a despin device of another embodiment according to the present invention. The central body 1 in this embodiment has a shape different from that of the above embodiment for installation on an object (whose speed is adapted to be reduced by the despin device) of a different shape. The connecting line 34 is wound around the tightening members 321 and is pulled by the adjusting member 322 to be in a tensioned state.

With regard to each mass 33 of this embodiment, a portion of the abutment member 331 connected to the connection seat 332 can be cylindrical and has an end face abutting the connection seat 332 such that the abutment member 331 and the connection seat 332 have a face-to-face contact therebetween. This enhances the connection stability between the abutment member 331 and the connection seat 332. Thus, the success possibility of release of the masses 33 can be increased.

In view of the foregoing, by the provision of the release-hitch devices 36 of the despin device according to the present invention, when the cables 35 are drawn by the masses 33 and are completely released, the cables 35 and the masses 33 connected together can disengage from the central base 1 and can be thrown out, effectively avoiding rewrapping of the cables 35 and impact to the flying vehicle by the masses 33. Thus, the flying vehicle will not deviate from its flying route. As a result, the trajectory of the payload can precisely be controlled to increase the success possibility of the mission.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. A despin device comprising:
   a central base including an outer periphery having a plurality of ball grooves, with the central base further including an axial end face extending transversely to the outer periphery and extending transversely to a central axis of the central base;

an outer rotational ring including a hollow interior, with the central base installed in the hollow interior, with the outer rotational ring including an inner wall face and an outer wall face, with the outer rotational ring further including a plurality of through-holes extending from the inner wall face through the outer wall face; and a despin module including a line cutter, a tensioning device, a plurality of masses, a connecting line, a plurality of cables, and a plurality of release-hitch devices, with the line cutter and the tensioning device mounted to the axial end face of the central base, with the plurality of masses symmetrically installed in the plurality of ball grooves of the central base and the plurality of through-holes of the outer rotational ring, with the connecting line connecting the plurality of masses, with the connecting line extending through the line cutter and tensioned by the tensioning device, with the plurality of cables wrapped around the outer periphery of the central base, with each of the plurality of cables including a first end attached to one of the plurality of masses and a second end, with each of the plurality of release-hitch devices including a hitch member fixed to the central base and a disengagement member releasably engaged with the hitch member and fixed to the second end of one of the plurality of cables.

2. The despin device as claimed in claim 1, with the outer periphery of the central base including a plurality of coupling grooves, with a number of the plurality of coupling grooves corresponding to a number of the plurality of ball grooves, with the hitch members respectively engaged in the plurality of coupling grooves, with each hitch member including a slant groove having an opening facing the inner wall face of the outer rotational ring, wherein each of the plurality of cables is wrapped around the outer periphery of the central base when the connecting line is intact, wherein each of the plurality of cables is freed when the connecting line is broken by the line cutter, wherein when the connecting line is intact, each disengagement member is tensioned by a corresponding one of the plurality of cables to engage with the slant groove of one of the hitch members, and wherein when the connecting line is broken, each disengagement member is drawn by a completely released corresponding one of the plurality of cables and disengages from the slant groove of one of the hitch members.

3. The despin device as claimed in claim 2, wherein each of the plurality of coupling grooves extends from the outer periphery of the central base through the axial end face of the central base.

4. The despin device as claimed in claim 3, wherein each of the plurality of ball grooves extends from the outer periphery of the central base through the axial end face of the central base.

5. The despin device as claimed in claim 1, with each of the plurality of masses including an abutment member and a connection seat connected to the abutment member, with each abutment member partially installed in one of the plurality of ball grooves, and with each connection seat installed in one of the plurality of through-holes of the outer rotational ring.

6. The despin device as claimed in claim 5, wherein the connecting line is connected to the abutment member of each of the plurality of masses and is opposite to each connection seat.

7. The despin device as claimed in claim 5, with each of the plurality of through-holes of the outer rotational ring having increasing inner diameters from the inner wall face towards the outer wall face of the outer rotational ring, with each connection seat including an inner end face connected to a corresponding one of the abutment members and an outer end face opposite to the inner end face, with each connection seat further including a peripheral face extending between the inner end face and the outer end face, with the peripheral face of each connection seat having increasing outer diameters from the inner end face towards the outer end face and forming a conical face matching a corresponding one of the plurality of through-holes of the outer rotational ring.

8. The despin device as claimed in claim 5, with a portion of each abutment member connected to a corresponding one of the connection seats being cylindrical and having an end face abutting the connection seat, and with each abutment member and the corresponding connection seat having a face-to-face contact therebetween.

9. The despin device as claimed in claim 2, with the central base further including a plurality of guiding pins mounted to the outer periphery of the central base, with each of the plurality of guiding pins including an outer surface with a plurality of guiding grooves, and with the plurality of cables wrapped around the outer periphery of the central base and respectively extending through the plurality of guiding grooves of the plurality of guiding pins.

10. The despin device as claimed in claim 9, wherein two aligned guiding grooves respectively of two adjacent guiding pins extend along a helix about the central axis of the central base.

11. The despin device as claimed in claim 9, with the outer periphery of the central base further including a plurality of positioning grooves, with each of the plurality of positioning grooves extending along an axis parallel to the central axis of the central base, and with the plurality of guiding pins respectively mounted in the plurality of positioning grooves.

12. The despin device as claimed in claim 9, with the plurality of guiding pins spaced from the plurality of ball grooves and the plurality of coupling grooves, and with the plurality of guiding pins spaced from each other at regular angular intervals.

13. The despin device as claimed in claim 1, further comprising: a rotating member coupled to an axial end of the outer rotational ring.

14. The despin device as claimed in claim 13, with the outer rotational ring including an inner flange on the axial end thereof, with the inner flange extending from the inner wall face of the outer rotational ring towards a central axis of the outer rotational ring, and with the inner flange of the outer rotational ring coupled to the rotating member.

15. The despin device as claimed in claim 1, further comprising: a plurality of buffering devices, with each of the plurality of buffering devices including a mounting seat and a roller rotatably mounted to the mounting seat, with the outer rotational ring further including an axial end having an end face with a plurality of notches, with each of the plurality of notches extending to the inner wall face of the outer rotational ring, with the mounting seat of each of the plurality of buffering devices engaged in one of the plurality of notches, with each roller installed in the outer rotational ring and located adjacent to an edge of one of the plurality of through-holes, with each roller adapted to contact one of the plurality of cables connected to the plurality of masses when a corresponding one of the plurality of masses is freed as the connecting line is broken, and with each roller adapted to be driven to rotate by the one of the plurality of cables when a corresponding one of the plurality of masses is freed as the connecting line is broken.

* * * * *